(12) United States Patent
Wang et al.

(10) Patent No.: US 8,585,992 B2
(45) Date of Patent: *Nov. 19, 2013

(54) SYNERGISTIC EFFECT OF SURFACTANT COMBINATIONS AS DEWATERING AIDS FOR ALUMINA TRIHYDRATE

(75) Inventors: Paul Qi Wang, Shanghai (CN); Steven Qun Dong, Shanghai (CN)

(73) Assignee: Nalco Company, Naperville, IL (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/226,614

(22) Filed: Sep. 7, 2011

(65) Prior Publication Data

US 2012/0288438 A1 Nov. 15, 2012

(30) Foreign Application Priority Data

May 9, 2011 (CN) .......................... 2011 1 0121789

(51) Int. Cl.
*B01D 37/00* (2006.01)
(52) U.S. Cl.
USPC ............ 423/127; 210/710; 210/728; 423/122
(58) Field of Classification Search
USPC .......... 423/121, 122, 127, 130, 131; 210/710, 210/728
See application file for complete search history.

(56) References Cited

U.S. PATENT DOCUMENTS

| 5,011,612 A | * | 4/1991 | Keeney | 210/712 |
| 5,167,831 A | * | 12/1992 | Dimas | 210/728 |
| 5,451,329 A | * | 9/1995 | Bode et al. | 210/728 |
| 2008/0110837 A1 | * | 5/2008 | Phillips et al. | 210/774 |

FOREIGN PATENT DOCUMENTS

| CN | 101746979 A | | 6/2010 |
| JP | 58-049416 | * | 3/1983 |

OTHER PUBLICATIONS

Translation of Japan 58-049416, Mar. 23, 1983.*
Fox et al, "The use of surfactant mixtures in the dewatering of alumina trihydrate," Light Metals, Warrendale, PA, 1987, pp. 159-163.

* cited by examiner

*Primary Examiner* — Steven Bos
(74) *Attorney, Agent, or Firm* — Benjamin E. Carlsen; Andrew D. Sorensen

(57) ABSTRACT

The invention is directed towards methods and compositions for treating slurry to better dewater alumina trihydrate precipitated from the Bayer process. The method comprises using a product comprising the combination of at least two surfactants together with an optional coupling agent to treat the alkaline slurry with certain amount of alumina trihydrate present. Synergistic effects between binary combinations of nonionic and anionic surfactants result in more efficient dewatering aids for alumina trihydrate slurry when combinations of such surfactants are applied. A coupling agent may be used in formulations to reduce viscosity of such surfactant combinations, allowing the practical application of such products.

10 Claims, No Drawings

SYNERGISTIC EFFECT OF SURFACTANT COMBINATIONS AS DEWATERING AIDS FOR ALUMINA TRIHYDRATE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to methods and compositions for improving the dewatering of mineral slurries. In particular, it relates to compositions and application of dewatering aids for use in the Bayer process with the aim of reducing moisture in filtered and washed aluminum hydrate. In the typical Bayer process for the production of alumina trihydrate, bauxite ore is pulverized, slurried with caustic solution, and then digested at elevated temperatures and pressures. The caustic solution dissolves oxides of aluminum, forming an aqueous sodium aluminate solution. The caustic-insoluble constituents of bauxite ore are then separated from the aqueous phase containing the dissolved sodium aluminate. Solid alumina trihydrate product is precipitated out of the solution and collected as product.

As described at least in part, among other places, in U.S. Pat. No. 6,814,873, the Bayer process is constantly evolving and the specific techniques employed in industry for the various steps of the process not only vary from plant to plant, but also are often held as trade secrets. As a more detailed, but not comprehensive, example of a Bayer process, the pulverized bauxite ore may be fed to a slurry mixer where an aqueous slurry is prepared. The slurry makeup solution is typically spent liquor (described below) and added caustic solution. This bauxite ore slurry is then passed through a digester or a series of digesters where the available alumina is released from the ore as caustic-soluble sodium aluminate. The digested slurry is then cooled, for instance to about 220° F., employing a series of flash tanks wherein heat and condensate are recovered. The aluminate liquor leaving the flashing operation contains insoluble solids, which solids consist of the insoluble residue that remains after, or are precipitated during, digestion. The coarser solid particles may be removed from the aluminate liquor with a "sand trap", cyclone or other means. The finer solid particles may be separated from the liquor first by settling and then by filtration, if necessary.

The clarified sodium aluminate liquor is then further cooled and seeded with alumina trihydrate crystals to induce precipitation of alumina in the form of alumina trihydrate, $Al(OH)_3$. The alumina trihydrate particles or crystals are then classified into various size fractions and separated from the caustic liquor. The remaining liquid phase, the spent liquor, is returned to the initial digestion step and employed as a digestant after reconstitution with caustic.

Within the overall process one of the key steps is that of precipitation of the alumina trihydrate from the clarified sodium aluminate liquor. After the insoluble solids are removed to give the clarified sodium aluminate liquor, also referred to as "green liquor", it is generally charged to a suitable precipitation tank, or series of precipitation tanks, and seeded with recirculated fine alumina trihydrate crystals. In the precipitation tank(s) it is cooled under agitation to induce the precipitation of alumina from solution as alumina trihydrate. The fine alumina trihydrate particles are re-used within the process and act as seed crystals which provide nucleation sites and agglomerate together and grow as part of the precipitation process. Larger sized crystals resulting from the precipitation step are separated and used directly as trihydrate product or more often further processed by a calcination step that produces alumina $Al_2O_3$ which is sold as product.

A key step in the Bayer process is the separation of the trihydrate crystals into the various size fractions (seed and product size material) and the subsequent separation of the crystals from the liquor from which they precipitated. The removal of the liquor is typically achieved by a filtration and water washing step. Such a filtration and washing process can be applied to both the seed crystals and/or the product sized alumina trihydrate but is most often and critically applied to the product sized alumina. It is critical that the product sized alumina trihydrate has only a minimal amount of caustic liquor remaining with the filtered cake since minimal soda content in the calcined product is required to maximize the value of the resulting alumina. As a result, product sized alumina trihydrate crystals typically undergo a series of water washing steps to remove caustic. However, moisture remaining with the filtered cake can also create an issue for producers since the subsequent heating and calcination of the trihydrate requires more energy input when an increased moisture content of the filtered trihydrate product occurs. As a consequence, alumina producers aim to minimize the moisture content of alumina trihydrate product. Dewatering aids are widely used by the alumina industry to improve filtration efficiency by reducing trihydrate moistures. Significant savings can be achieved in the plant by improved dewatering and deliquoring of hydrate as a result of reduced moisture levels and lower energy costs in calcination. A wide range of variables affect the dewatering of the hydrate. These include slurry temperature, filtrate surface tension, solid/liquid contact angle, pressure gradient across the cake and particle size distribution and shape.

As described at least in part, among other places, in U.S. Pat. No. 5,011,612, a range of dewatering aid products based on a variety of surfactant chemistries are either available or known to those familiar with the art. Such products include surfactants and/or surfactant blends containing alkylsulfosuccinates, alkyl aryl sulfonates, ethoxylated alcohols or fatty acids. Examples are mentioned in Chinese Patent application CN 200910243379 and Scientific Paper *The Use of Surfactant Mixtures in the Dewatering of Alumina Trihydrate*, by D. J. Fox et al, School of Chemical Engineering and Industrial Chemistry, University of New South Wales, Australia (1987) pp. 159-163. Others include the use of fatty acid of at least 12 carbon atoms in admixture with non-ionic surfactants in U.S. Pat. No. 5,167,831. While a number of these are effective, issues remain for the industry in terms of cost and/or adverse impacts of such materials on downstream processing steps within Bayer plants. Thus there is clear need and utility for a method of improving the range and performance of dewatering aids that can be used in the Bayer process.

The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed to a method of dewatering of aluminum trihydrate precipitated from the Bayer process. The method comprises the steps of producing a dewatering aid by mixing at least two surfactants with the optional addition of a coupling agent and applying the dewatering aid to the trihydrate dewatering step of the Bayer Process to reduce the moisture content of an aluminum trihydrate filter cake.

The dewatering aid composition may be a mixture of a nonionic surfactant and an anionic surfactant and may also include a solvent or coupling agent. The nonionic surfactant may be selected from the group consisting of alcohol ethoxylates and alkyl phenol ethoxylates. The anionic surfactant may be selected from the group consisting of alcohol alkoxy sulfates and alcohol alkoxy sulfonates. The alkyl phenol ethoxylates may be selected from the group consisting nonylphenol ethoxylates, and the alcohol alkoxy sulfates are selected from sodium lauryl ether sulfates. The alcohol alkoxy sulfonates may be selected from sulfosuccinic acid ester with ethoxylated alcohols.

The coupling agent may be selected from alkylene glycol, di-alkylene glycol, and any combination thereof.

A reduction of the moisture content of an aluminum hydrate filter cake may be achieved by directly adding such a dewatering aid to the filter cake wash water prior to its contacting the filter cake or alternatively by addition to the alumina trihydrate slurry prior to filtration.

Additional features and advantages are described herein, and will be apparent from, the following Detailed Description.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Alcohol Alkoxy Sulfate" means a compound of formula $R_1O(R_2CH_2CH_2O)_xSO_3^-M^+$ where $R_1$ is $C_3$-$C_{18}$ alkyl, $R_2$ is absent or is a methylene chain containing from 1 to about 50 carbon atoms. M is a counterion such as H, Na, K, NH4, and the like. Representative alcohol alkoxy sulfates include such commercially available products as sodium and ammonium lauryl ether sulfate with 2-3 moles of ethoxylation.

"Alkyl phenol ethoxylate" means a compound of formula $R_3O(R_2CH_2CH_2O)_pSO_3^-M^+$ where $R_3$ is phenyl, optionally substituted with one or two $C_8$-$C_{12}$ alkyl groups, $R_2$ is absent or is a methylene chain containing from 1 to about 50 carbon atoms and p is 1-30. Preferred alkyl phenol ethoxylates are those where $R_3$ is phenyl substituted with $C_9$ alkyl and p is 1-20 alkyl phenol ethoxylates.

"Alkyl" means a monovalent group derived from a straight or branched chain saturated hydrocarbon by the removal of a single hydrogen atom. Representative alkyl groups include methyl, ethyl, n- and iso-propyl, and the like.

"Alkoxyl" means an alkyl-O group wherein alkyl is defined herein. Representative alkoxyl groups include methoxyl, ethoxyl, propoxyl, butoxyl, and the like.

"Alkoxy" has the same meaning as "alkoxyl".

"Alkylene" means a divalent group derived from a straight or branched chain saturated hydrocarbon by the removal of two hydrogen atoms. Representative alkylene groups include methylene, ethylene, propylene, and the like.

"Coupling agent" means a composition of matter whose presence with two or more other components in a mixture results in changes in the physical properties of those other components, such changes include but are not limited to a change in viscosity. Coupling agents include but are not limited to compositions that function as solvents for one or both of the other components and compositions that do not function as solvents for one or both of the other components.

"Fatty acid" means a formula compound of $R_4COOH$ where $R_4$ is $C_{12}$-$C_{18}$. They may be pure fatty acids although they may be mixed fatty acids of the types produced from animal fats and vegetable oil.

"Dialkyl sulfosuccinate" means a compound of formula $R_5OOCCH_2CH(SO_3M)COOR_6$, where $R_5$ and $R_6$ are independently selected from amyl, octyl, 2-ethyl hexyl, isobutyl, tridecyl, or lauryl and M is a counterion such as H, Na, K, NH4, and the like. A representative dialkyl is di(2-ethyl hexyl) sulfosuccinate.

"DI" means deionized water.

"Sulfosuccinic acid ester with ethoxylated alcohols" means a compound of formula $R_8(OCH_2CH_2O)_tOOCH(SO_3M)CH_2COOM$, where $R_8$ is $C_8$-$C_{18}$ hydroxyalkyl or alkyl phenol, t is an integer from 1 to about 10 and M is a counterion such as H, Na, K, NH4, and the like.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology,* 5th Edition, (2005), (Published by Wiley, John & Sons, Inc.) this definition shall control how the term is to be defined in the claims.

In at least one embodiment the process of dewatering of aluminum hydrate precipitated from the Bayer process is improved through the use of an inventive method. The method comprises using a composition comprising two surfactants and a coupling agent to treat the alkaline slurry with a certain amount of alumina trihydrate present. In at least one embodiment, the composition comprises at least one nonionic and at least one anionic surfactant in a dewatering process. Use of this composition results in an unexpectedly large increase in dewatering effectiveness when applied to trihydrate dewatering compared to the use of either surfactant applied individually. Furthermore, by adding an alkylene or di-alkylene glycol ether coupling agent, the viscosity of the two component blend can be significantly improved without detriment to the advantageous dewatering properties. In at least one embodiment, in the absence of the coupling agent the two surfactants of the composition would be in a gel form which would hinder the application of the product in practice. However, when combined with the coupling agent the composition is an easily flowing liquid.

In at least one embodiment the combination of surfactant components results in more effective dewatering than that achieved by either component when used individually. As a result, the invention identifies the synergistic effect of the combinations of surfactants. When applied to aluminum trihydrate crystals such combinations exhibit more efficient dewatering. The ratio of binary combination of nonionic and anionic surfactants has a significant effect on the dewatering of aluminum trihydrate filter cake. The optimized ratios of the combination vary according to different surfactants selected.

In at least one embodiment the composition is not diluted with a solvent or coupling agent.

In at least one embodiment the use of either of the two surfactants in the absence of the other is excluded.

EXAMPLES

The foregoing may be better understood by reference to the following examples, which are presented for purposes of illustration and are not intended to limit the scope of the invention.

Example 1

The experimental procedure was modeled on the alumina trihydrate product dewatering operations at a typical alumina refinery. Unwashed plant alumina trihydrate seed was used in a filtration test, in which about 10 wt % of Bayer liquor was entrained. Typically, 100 g of wet seed were diluted with 100 ml of DI (deionized) water; the resulted slurry was stored in an oven at 80° C. for use in subsequent filtration tests.

A variety of dewatering reagent solutions were produced by mixing a 1 wt % (1% by weight of the solution) aqueous solution of nonionic surfactant alkyl phenol ethoxylate (NP-9) with a 1 wt % aqueous solution of anionic alcohol alkoxy sulfate (AES) at different ratios as shown in table 1. A certain amount (0.5 g for 50 ppm and 0.3 g for 30 ppm) of 1 wt % NP-9 and 1 wt % AES were individually added to 100 g of 80° C. hot water and this solution was used in the washing step of the test.

The slurry of alumina trihydrate seed as detailed above was filtered using a vacuum filtration apparatus (Gast 71R5: power 0.25 kW, filtration plate diameter 11 cm) middle speed type of filter paper. Vacuum was maintained at 88 kPa to ensure consistent filtration. The slurry was added to the filter slowly in order to develop an even thickness of alumina trihydrate cake and the vacuum was applied for 10 seconds. After this time the dewatering aid solutions were then added with the entire solution added within a 20 second period. After all the surface water disappeared the filtration vacuum was maintained for a further 1 minute before the cake was removed. Cakes were weighed then placed in an oven at 110° C. overnight. After this time, the samples were removed from the oven and re-weighed. The weight loss was determined to be the amount of residual moisture remaining in the cake after filtration and was recorded as a percentage of the total weight. Each individual treatment was replicated in individual tests. Doses of 30 ppm and 50 ppm of the listed formulations were assessed in the tests.

As shown in Tables 1 and 2, different ratios of surfactants in the different formulations have a significant impact on the dewatering and residual moisture of the trihydrate cake.

With a single component product (NP-9) which was a nonionic surfactant compound of formula $R_3O(CH_2CH_2O)_pH$ where $R_3$ is phenyl substituted with C9 alkyl groups and p is 9, the residual moisture recorded was 3.34% and 3.13% at dosages of 30 and 50 ppm, respectively. This compares to the result of an untreated sample of trihydrate with no dewatering aid addition (blank) where a residual moisture of 5.01% was recorded in testing. Surprisingly however, application of combination blends of NP-9 with AES results in even lower residual moisture being recorded, with the lowest at 2.18% for a 50:50 ratio mixture. While both surfactants are effective as dewatering aids when used individually, their combination across a broad range of ratios results in an enhancement of the dewatering effectiveness.

TABLE 1

Effect of individual and combination blends of NP-9 and AES on dewatering efficiency.

| NP-9:AES (wt %) | Dosage (ppm) | Moisture (wt %) | Moisture Reduction (%) |
|---|---|---|---|
| 0:100 | 30 | 2.77 | 44.71 |
| 10:90 | 30 | 2.58 | 48.50 |
| 30:70 | 30 | 2.47 | 50.70 |
| 50:50 | 30 | 2.18 | 56.49 |
| 70:30 | 30 | 2.30 | 54.09 |
| 90:10 | 30 | 2.92 | 41.71 |
| 100:0 | 30 | 3.34 | 33.33 |
| Blank | 0 | 5.01 | 0 |

Dose 30 ppm.

TABLE 2

Effect of individual and combination blends of NP-9 and AES on dewatering efficiency.

| NP-9:AES (wt %) | Dosage (ppm) | Moisture (wt %) | Moisture Reduction (%) |
|---|---|---|---|
| 0:100 | 50 | 2.43 | 51.50 |
| 10:90 | 50 | 1.85 | 63.07 |
| 30:70 | 50 | 1.75 | 65.07 |
| 50:50 | 50 | 1.4 | 72.06 |
| 70:30 | 50 | 1.49 | 70.26 |
| 90:10 | 50 | 2.36 | 52.89 |
| 100:0 | 50 | 3.13 | 37.52 |
| Blank | 0 | 5.01 | 0 |

Dose 50 ppm.

Example 2

The same test procedure as described in Example 1 was used. In this case formulations tested were combinations of NP-9 with NPSS, an anionic surfactant compound of formula $R_8(OCH_2CH_2O)_tOOCH(SO_3M)CH_2COOM$, where $R_8$ is Nonyl Phenol, t is 9 and M is Na. This example again demonstrated the significant beneficial effect of applying blends of nonionic and anionic surfactants as dewatering aids for alumina trihydrate slurries. In this case, the optimum ratio for NP9 and NPSS differs from that of NP9 and AES, which is around 30% of NP9 and 70% of NPSS shown in both tables 3 and 4.

TABLE 3

Effect of individual and combination blends of NP-9 and NPSS on dewatering efficiency.

| NP-9:NPSS (wt %) | Dosage (ppm) | Moisture (wt %) | Moisture Reduction (%) |
|---|---|---|---|
| 0:100 | 30 | 2.85 | 45.61 |
| 10:90 | 30 | 2.63 | 49.80 |
| 30:70 | 30 | 2.28 | 56.49 |
| 50:50 | 30 | 2.4 | 54.19 |
| 70:30 | 30 | 2.91 | 44.47 |
| 90:10 | 30 | 3.83 | 26.91 |
| 100:0 | 30 | 3.91 | 25.38 |
| Blank | 0 | 5.07 | 0 |

Dose 30 ppm.

TABLE 4

Effect of individual and combination blends
of NP-9 and NPSS on dewatering efficiency.

| NP-9:NPSS (wt %) | Dosage (ppm) | Moisture (wt %) | Moisture Reduction (%) |
|---|---|---|---|
| 0:100 | 50 | 1.86 | 64.50 |
| 10:90 | 50 | 1.77 | 66.22 |
| 30:70 | 50 | 1.44 | 72.52 |
| 50:50 | 50 | 1.95 | 62.79 |
| 70:30 | 50 | 2.14 | 59.16 |
| 90:10 | 50 | 2.59 | 50.57 |
| 100:0 | 50 | 3.33 | 36.45 |
| Blank | 0 | 5.24 | 0 |

Dose 50 ppm.

Example 3

This example compares the performance of three separate dewatering aid products:
Formula "A" is a product containing a combination of a nonionic surfactant (NP-9) (10-35%) and an anionic surfactant (AES of 70% active) (10-55%) together with dipropylene glycol monomethyl ether (5-30%) and 10-35% of pure water.
Formula "B" is a commercially available product available from Nalco under the name 85488.
Formula "C" is a product containing a blend of a nonionic surfactant (NP-4) (51-90%) a compound of formula $R_3O(CH_2CH_2O)_pH$ where $R_3$ is phenyl substituted with $C_9$ alkyl groups and p is 4) and a fatty acid (10-49%).

The dewatering test method used to assess these products was the same as that used in examples 1 and 2 above. Results are shown in Table 5. The combination product "A" provides the most effective dewatering at 30 and 50 ppm dose rates.

TABLE 5

Comparison of dewatering of dewatering
products tested in example 3.

| Sample | Dosage (ppm) | Moisture (wt %) | Moisture Reduction (%) |
|---|---|---|---|
| A | 30 | 2.29 | 52.59 |
| B | 30 | 2.67 | 44.72 |
| C | 30 | 4.1 | 15.11 |
| Blank | 0 | 4.83 | 0 |
| A | 50 | 1.68 | 65.22 |
| B | 50 | 2.29 | 52.59 |
| C | 50 | 3.2 | 33.74 |
| Blank | 0 | 4.83 | 0 |

Example 4

This example demonstrates the advantage of using a coupling agent in order to produce a dewatering aid suitable for commercial use in the Bayer process. Directly blending the two surfactants used in formula "A" in example 3 results in a gel product with a viscosity greater than 15000 cps at room temperature. Such a product is difficult to pump and handle in practice and such high viscosity would typically exclude such a surfactant blend from application. However, by addition of 20% by weight of di-alkylene glycol ether as a coupling agent (as presented in formula "A") the viscosity of the resulting product can be reduced to less than 1000 cps at room temperature.

In at least one embodiment, dialkylene glycol ether functions as a coupling agent which facilitates interactions between the two surfactants and thereby reduces their overall viscosity. In at least one embodiment the coupling agent is not a solvent but is a composition of matter which facilitates interactions between the two surfactants and thereby reduces their overall viscosity.

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9; and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of dewatering of alumina trihydrate precipitated from the Bayer process by addition of a dewatering aid to the Bayer process at a point selected from the group consisting of the trihydrate dewatering step, the filter cake wash water prior to its contacting the filter cake, the alumina trihydrate slurry prior to filtration, and the aluminum trihydrate crystals, said dewatering aid being comprised of:
   a. at least two surfactants, one of which is a non-ionic surfactant and the other an anionic surfactant, and
   b. a coupling agent
   wherein applying said dewatering aid reduces the moisture content of an alumina trihydrate filter cake which is produced by filtering slurry of alumina trihydrate obtained within the Bayer process and adding the dewatering aid to the process.

2. The method of claim 1 wherein the slurry of alumina trihydrate is an alkaline slurry with Bayer process liquor and solid alumina trihydrate present.

3. The method of claim 1 further comprising the step of adding wash water to the filter cake wherein the dewatering aid is added to the wash water prior to its the wash water contacting the filter cake.

4. The method of claim 1 wherein the dewatering aid product is a mixture of at least one nonionic surfactant, at least one anionic surfactant and a coupling agent.

5. The method of claim 4 wherein the nonionic surfactant is selected from the group consisting of alcohol ethoxylates and alkyl phenol ethoxylates and the anionic surfactant is selected from the group consisting of alcohol alkoxy sulfates and alcohol alkoxy sulfonates.

6. The method of claim 5 wherein the alkyl phenol ethoxylates are nonylphenol ethoxylates, and the alcohol alkoxy sulfates are sodium lauryl ether sulfates and the alcohol alkoxy sulfonates are sulfosuccinic acid esters.

7. The method of claim 1 where the ratio of nonionic to anionic surfactants is between 1:99 to 99:1.

8. The methods of claim 7 wherein a nonionic surfactant compound of formula $R_3O(CH_2CH_2O)_pH$ where $R_3$ is phenyl substituted with C9 alkyl groups and p is 9 is combined with an anionic surfactant compound of formula $R_8(CH_2CH_2O)_t OOCH(SO_3M)CH_2COOM$, where $R_8$ is nonyl phenol, t is 9 and M is Na, or an anionic surfactant, or an ethoxylated sodium lauryl ether sulfate.

9. The method of claim 1 wherein the dewatering aid dosage is in the range of 1-100 ppm.

10. The method of claim 1 wherein the coupling agent is selected from an alkylene or di-alkylene glycol ether.

\* \* \* \* \*